March 13, 1928.

J. C. W. BEALL 1,662,054

EYE TESTING DEVICE

Filed July 30, 1926

Inventor:
John C. W. Beall

Patented Mar. 13, 1928.

1,662,054

UNITED STATES PATENT OFFICE.

JOHN C. W. BEALL, OF WASHINGTON, DISTRICT OF COLUMBIA.

EYE-TESTING DEVICE.

Application filed July 30, 1926. Serial No. 126,039.

The object of this invention is to produce a new and useful method of, and apparatus for, eye-testing, particularly for use in conjunction with the use of trial-frames.

Figure 1:
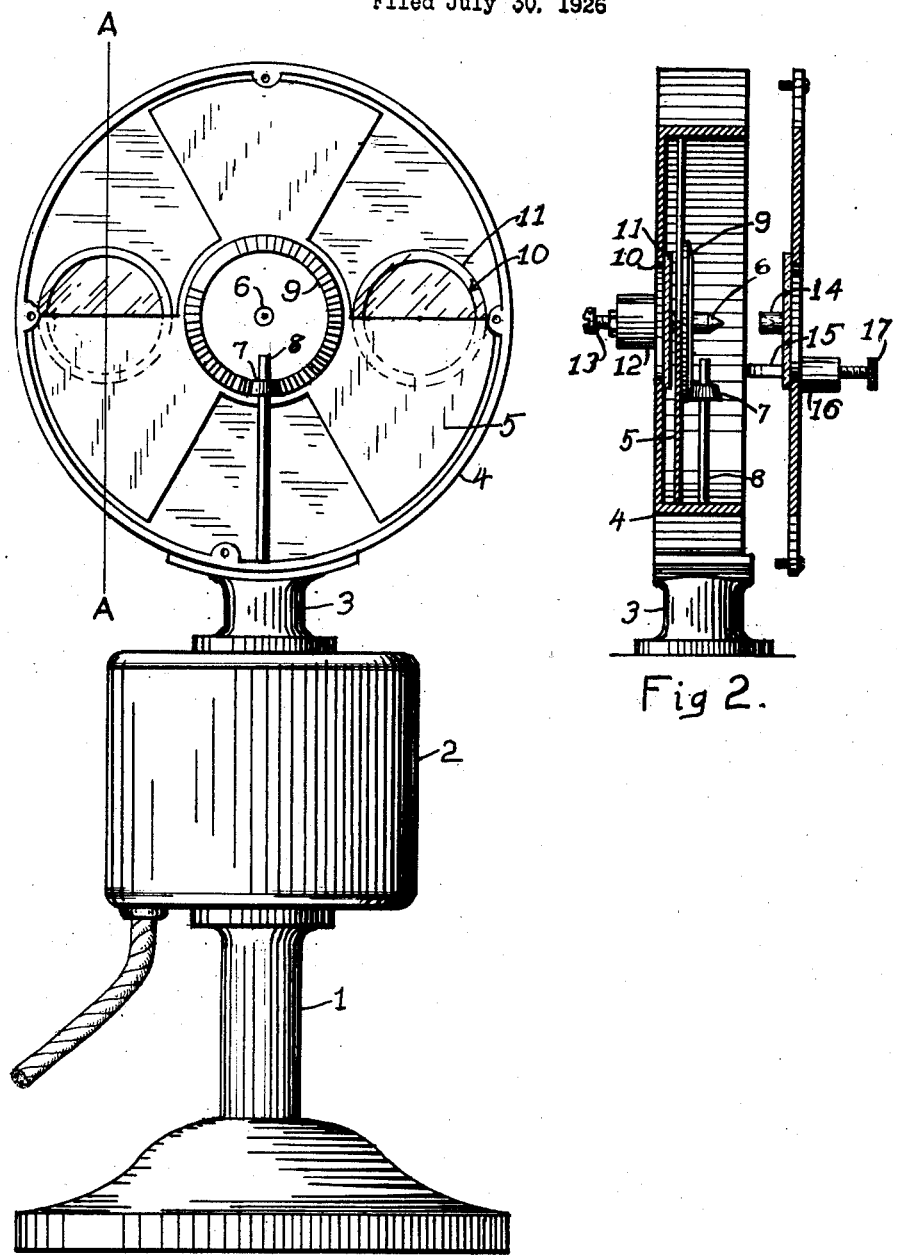
Figure 1 is a front view of one form of apparatus with the cover removed.
Figure 2:
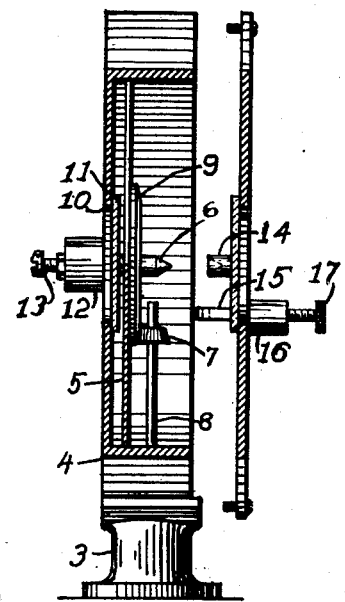
Figure 2 is a section on the line A—A of Figure 1, showing the cover in appropriate relation thereto.

It is quite customary for persons to have their eyes examined in the first instance by a specialist who uses appropriate drugs to paralyze the accommodative functions of the eye during the examination, and who thereby can secure accurate measurements of the type and amount of the visual errors. However, it is likewise quite customary for persons, after the type of the errors has been determined, to depend on occulists who use only trial-frame tests without the use of paralyzing drugs for the determination of variations in the required correction.

In this second type of examination errors will arise due to the exercise of the accommodative action of the eyes. These errors are generally of less magnitude than the differences between lenses of the ophthalmic series, and when the same for both eyes will do little or no harm.

However, quite often the error will not be the same on both eyes, particularly when they require different corrections, and as a consequence the eyes will be under a continual strain due to the difference in accommodation required, and it is the purpose of this invention to eliminate, or at least minimize, this difference of error.

The manner in which the error arises is as follows: One eye is tested, while the other is kept covered, and a suitable correction determined by the trial-frame; and then this eye is covered, and a suitable correction for the other is determined in a like manner. Either or both of these may be affected by the accommodative power of the eye. Then the two eyes are tried together, or even sometimes by sliding the covers over them alternately, and if no marked discrepancy appears the corrections are considered sufficiently accurate. But in the test of the two eyes together a certain amount of mutual accommodation, i. e. accommodation of each to the deficiencies of the other, also comes into play and may render the respective corrections apparently consistent when they actually require different accommodation by the two eyes. This difference, although not noticeable under these test conditions, soon manifests itself in the usual symptoms of eye-strain.

In order to avoid this difficulty, after the testing of the eyes separately, I place a shutter, adapted to obscure the eyes alternately at a predetermined speed, between the eyes and the test-object, and I then operate the shutter at a speed such that the change from vision by one eye to vision to the other takes place in less than the period of persistence of vision, while the whole cycle from one eye to the other and back to the first takes place in a period greater than that of persistence of vision and preferably less than the time required for a change in the accommodation of the eyes.

In this test, if the eyes are provided with proper corrections there will appear to be a single test object in a fixed position, while if the corrections are not properly balanced the object will appear to behave accordingly. That is, if the lack of balance is in spherical power the object will appear to flicker back and forth, or at certain speeds there may appear to be two objects at different distances, and if there is a difference in prismatic correction the object will apparently jump up and down or sideways. The main thing in this test is to change quickly from one eye to the other, as distinguished from the usual slow change by sliding a cover in the trial-frame and then removing the cover from the other eye. Due to the discontinuity of vision by each eye during this test there is much less opportunity for mutual accommodation to come into play than in the usual final test with both eyes simultaneously.

The form of the device preferred by reason of its simplicity and sturdiness is shown in the drawing, but many variations thereof will be obvious to one skilled in the art, and, in fact, almost any viewing shutter used in stereoscopic motion picture projection can be readily adapted to the purpose through slight changes.

In the present form of the device the electric motor (2), mounted on the base (1), drives the shutter (5) through the bevel friction-gear (9). The friction-gear is preferred because of its relative silence. The shutter is enclosed in the casing (4), and is supported by the adjustable bearing

(13) and the fixed bearing (14). The sight holes (10) are provided with glass covers (11) to prevent the entrance of dust.

The upper end of the motor shaft (8), which carries the friction wheel (7), is supported by a bearing (15) sliding in the block (16) and adjustable by means of the screw (17) to provide the proper pressure on the driving surface. The wheel (7) is preferably of fibre or similar material, while the ring (9) on the face of the shutter is preferably of brass or steel.

A rheostat or equivalent control means may be provided for the motor to adjust the speed, and although this is not absolutely essential, it is highly desirable.

The operation of the device is obvious from the foregoing description,—the patient wearing the trial-frame with substantially appropriate lenses views the test chart through the holes (10) while the shutter is rotated at the approximate speed, and the trial lenses are then altered until freedom from jump of the image is secured. The test may also be applied without the trial-frames to determine if the eyes have similar characteristics.

I claim:

1. The method of testing for balance between the eyes comprising causing the patient to view a test object and then obscuring the vision of his eyes alternately, the period between successive obscurations of each eye being greater than, and the period between the obscurations of the two eyes being less than, the period of persistence of vision.

2. The method of testing for balance between the eyes comprising causing the patient to view a test object through trial-lenses and then obscuring the vision of his eyes alternately, the period between successive obscurations of each eye being greater than, and the period between the obscurations of the two eyes being less than, the period of persistence of vision.

3. The method of testing for balance between the eyes comprising causing the patient to view a test object through trial-lenses and then obscuring the vision of his eyes alternately, the period between successive obscurations of each eye being greater than, and the period between the obscurations of the two eyes being less than, the period of persistence, and altering the trial lenses until apparent immobility of the object is secured.

4. The method of testing for balance between the eyes comprising causing the patient to view a test object through trial lenses and then obscuring the vision of his eyes alternately, the period between successive obscurations of each eye being greater than, and the period between the obscurations of the two eyes being less than, the period of persistence of vision, and altering the trial lenses until flicker of the image substantially disappears.

5. The method of testing for balance between the eyes comprising causing the patient to view a test object through trial lenses and then obscuring the vision of his eyes alternately, the period between successive obscurations of each eye being greater than, and the period between the obscurations of the two eyes being less than, the period of persistence of vision, and altering the trial lenses until positional flicker of the image substantially disappears.

6. A device for use in eye-testing comprising means for obscuring the eyes alternately and a variable speed motor having means for driving the obscuring means at a rate of from one but less than sixteen obscurations per second.

7. A device for use in eye-testing comprising means for obscuring the eyes alternately and variable speed operating means for driving the obscuring means at a rate of not less than one but less than sixteen obscurations per second.

8. A device for use in eye-testing comprising means for obscuring the eyes alternately and variable speed driving means for operating the obscuring means at such a rate that the period between successive obscurations of each eye is greater than, and the period between obscurations of the alternate eyes is less than, the period of persistence of vision.

9. A device for use in eye-testing comprising a shutter adapted to obscure the eyes alternately, a motor, and speed reduction drive means connecting the motor and shutter and of such ratio that the shutter will be driven at such a speed that the period between successive obscurations of each eye will be greater than, and the period between obscurations of the alternate eyes will be less than, the period of persistence of vision.

10. A device for use in eye-testing comprising a shutter adapted to obscure the eyes alternately, a motor, and speed reduction driving means connecting the motor and the shutter and of such ratio that the shutter will be driven thereby at a speed of not less than one but less than sixteen obscurations per second.

In testimony whereof I hereby affix my signature.

JOHN C. W. BEALL.